United States Patent [19]

Jacobs et al.

[11] Patent Number: 6,006,285
[45] Date of Patent: Dec. 21, 1999

[54] COMPUTER SYSTEM CAPABLE OF PLAYING AUDIO CDS IN A CD-ROM DRIVE INDEPENDENT OF AN OPERATING SYSTEM

[75] Inventors: William E. Jacobs, The Woodland; Daniel V. Forlenza; James L. Mondshine, both of Cypress; Tim L. Zhang, Spring; Gregory B. Memo, Spring; Kevin R. Frost, Spring; Lonnie J. Pope, Houston, all of Tex.

[73] Assignee: Compaq Computer Corporation, Houston, Tex.

[21] Appl. No.: 08/846,641

[22] Filed: Apr. 30, 1997

[51] Int. Cl.⁶ .............................. G06F 3/06; G11B 20/10
[52] U.S. Cl. .......................... 710/14; 710/131; 710/266; 713/310
[58] Field of Search .............................. 395/834; 710/14, 710/266, 131; 713/310; 709/301

[56] References Cited

U.S. PATENT DOCUMENTS

| | | | |
|---|---|---|---|
| 4,149,043 | 4/1979 | Itoh et al. | 179/100 |
| 4,497,021 | 1/1985 | Fukuda et al. | 364/200 |
| 4,898,483 | 2/1990 | Lizuka | 400/61 |
| 4,926,373 | 5/1990 | Takenaka | 364/900 |
| 5,377,358 | 12/1994 | Nakamura | 395/500 |
| 5,404,546 | 4/1995 | Stewart | 395/750 |
| 5,592,640 | 1/1997 | Minoura | 395/428 |
| 5,657,445 | 8/1997 | Pearce | 395/186 |
| 5,745,772 | 4/1998 | Klein | 395/739 |
| 5,796,984 | 8/1998 | Pearce et al. | 395/500 |
| 5,815,679 | 9/1998 | Liu | 395/309 |

FOREIGN PATENT DOCUMENTS 9-101848   4/1997   Japan .............................. G06F 1/32

OTHER PUBLICATIONS

Alan Freedman, "The Computer Desktop Encyclopedia," pp. 47, 226, 258, 479–480, 1996.
Alan Freedman, "The Computer Desktop Encyclopedia," pp. 47, 226, 258, 479–480, 1996.
"Intel48™ SL Microprocessor SuperSEt Programmer's Reference Manual", Intel Corp., (Nov. 1992).
"Enhanced IDE 95/96 Guide" Western Ditigal, Ver. 0.95 (Mar. 17, 1995).
"Pentium™ Processor User's Manual", vol. 3: Architecture and Programming Manual, Intel Corp. (1994).

*Primary Examiner*—Thomas C. Lee
*Assistant Examiner*—Albert Wang
*Attorney, Agent, or Firm*—Akin, Gump, Strauss, Hauer & Feld, L.L.P.

[57] ABSTRACT

A computer system is capable of playing audio CDs in a CD-ROM drive independent of the operating system by using an embedded CD-ROM drive application or a CD-ROM drive controller. When an audio CD mode switch of the computer system is in an "on" state and the main power switch of the computer is in an "off" state, the computer system is in an audio CD mode. When the computer is placed in such an audio CD mode, the computer either loads the embedded CD application from a non-volatile memory region such as read-only-memory (ROM) region or enables the CD-ROM drive controller of the CD-ROM drive to receive a CD selection and transmit the selections to the CD-ROM drive. The embedded CD application includes an embedded CD-ROM device driver for driving the CD-ROM drive to process audio CDs, power-on-self test (POST) code for selectively powering and initializing hardware devices in the computer system, initialization code for the embedded CD-ROM device driver, and system management interrupt/keyboard controller interface code used for processing the selection of a CD button of the computer system.

10 Claims, 6 Drawing Sheets

COMPUTER SYSTEM CAPABLE OF PLAYING AUDIO CDS IN A CD-ROM DRIVE INDEPENDENT OF AN OPERATING SYSTEM

RELATED APPLICATIONS

This application is related to the following copending, concurrently filed, and commonly assigned United States patent applications which are hereby incorporated by reference:

U.S. patent application Ser. No. 08/846,333, entitled "COMPUTER INTERFERENCE WITH HARD WIRED BUTTON ARRAY," to James Brainard, Mark E. Taylor, Larry W. Kunkel, and Steve Walsh, still pending; and U.S. patent application Ser. No. 08/846,544, entitled "FUNCTION SELECTOR WITH HARD WIRED BUTTON ARRAY ON COMPUTER CHASSE," to James Brainard, Mark E. Taylor, Larry W. Kunkel, and Steve Walsh, still pending.

BACKGROUND OF THE INVENTION

1. Field of the Invention

The present invention relates to a computer system capable of playing audio CDs in a CD-ROM drive independent of an operating system by using an embedded CD-ROM drive application or a CD-ROM drive controller.

2. Description of the Related Art

Operating a CD-ROM drive in a computer system has required booting an operating system and loading and utilizing a CD-ROM drive application. The RAM-based CD-ROM device driver of the CD-ROM drive application allowed for operation of the CD-ROM drive. The lengthy duration of the booting process for an operating system and the considerable user interaction required by a CD-ROM drive application render playing an audio CD in the CD-ROM drive of a computer system, as opposed to in a conventional audio CD player, undesirable. An audio CD player, unlike a CD-ROM drive of a computer system, does not involve a timely initialization process and substantial user interaction. As such, despite the CD-ROM drive present in conventional computer systems, users have maintained a separate audio CD player in place of the portable computer. In addition, where a user is away from his or her audio CD player, a conventional computer system due to its initialization and user interaction requirements is unsuited to playing an audio CD as quickly and easily as allowed by a conventional audio CD player. Thus, because of the initialization process and user interaction required, portable computer users would often carry a separate audio CD player for music listening even though the portable computer had music playing capability.

SUMMARY OF THE INVENTION

With the present invention, a computer system is capable of playing audio CDs in a CD-ROM drive independent of an operating system by using an embedded CD-ROM drive application or a CD-ROM drive controller. The computer system of the present invention includes an audio CD mode switch for selectively activating the computer to function as a computer (in a PC mode) or to play audio CDs without a time consuming operating system start up (in an audio CD mode). The audio CD mode switch can activate either a non-volatile memory region which stores system BIOS code for loading an operating system and a CD-ROM drive application associated with the operating system or a non-volatile memory region storing an embedded CD-ROM drive application for audio playback. Thus, the present invention provides a pseudo-embedded architecture for a portable computer with audio CD capability independent of an operating system.

The audio CD mode switch of the present invention is enabled when the main power switch of the computer is in an "off" state. When the audio CD mode switch is in an "on" state, the computer system enters an audio CD mode and either loads the embedded CD-ROM drive application or enables the CD-ROM drive controller of the CD-ROM to receive a CD button selection and transmit the selection to the CD-ROM drive. The embedded CD-ROM drive application includes power-on-self test (POST) code for selectively powering and initializing hardware devices in the computer system, an embedded CD-ROM device driver for driving the CD-ROM drive to process audio CDs, initialization code for the embedded CD-ROM device driver, and system management interrupt/keyboard controller interface code.

For the keyboard controller embodiment of the present invention, system management interrupt/keyboard controller interface code is used to process a CD button selection. When selection of a CD button is detected, a keyboard controller fetches the keycode corresponding to the selected CD button. The keyboard controller next generates a system management interrupt (SMI) which hands off control from the keyboard controller to the SMI handler placing the computer in a system management mode. The SMI handler fetches a keycode from the keyboard controller and places the keycode in a keycode cache. The handler then generates a non-maskable interrupt (NMI) for calling the embedded CD-ROM device driver to drive the CD-ROM drive to process the selected CD button command. When the computer system exits the system management mode, the NMI is serviced such that the embedded CD-ROM device driver is called. The embedded CD-ROM driver serving as a NMI handler fetches the keycode from the keycode cache and drives the CD-ROM drive to process the keycode after the processor has received and serviced an interrupt request from the CD-ROM drive.

Alternatively, in the CD-ROM drive controller embodiment of the present invention, a CD-ROM drive controller instead of a keyboard controller is used to scan the CD buttons. The CD button selection is then transmitted to the CD-ROM drive by the CD-ROM drive controller. Thus, the present invention by using either a keyboard controller, embedded code, and the SMI handler in the keyboard controller embodiment or a CD-ROM drive controller in the CD-ROM drive controller embodiment allows for audio CD functionality without use of an operating system.

In addition, the portable computer of the present invention preferably provides the CD buttons and the audio CD mode switch on the external surface of the portable computer. In this way, audio CD functionality may be achieved while the portable computer system case is in a closed state.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
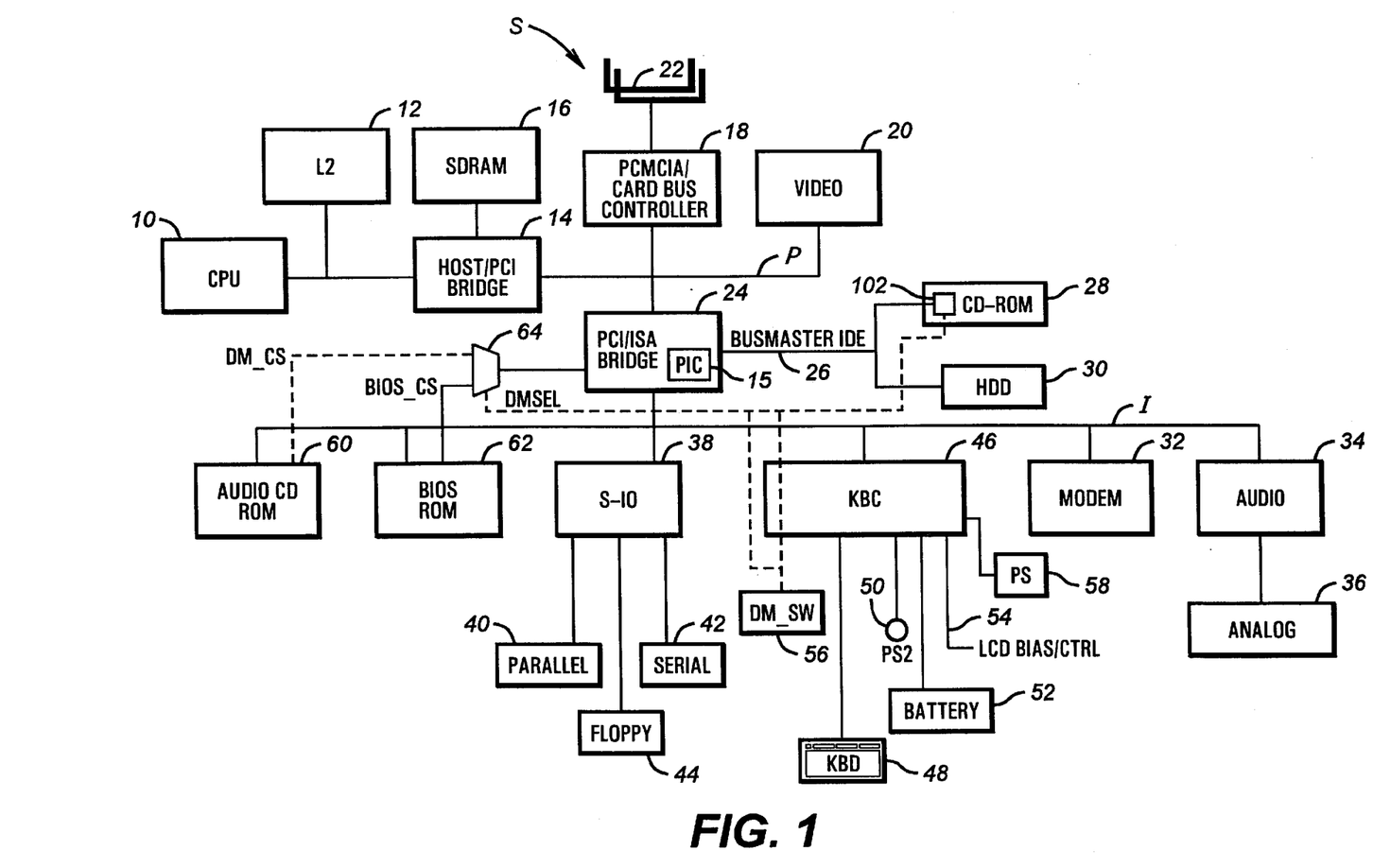
FIG. 1 is a schematic circuit diagram of a computer system of the present invention.

Turning to FIG. 1, a schematic circuit diagram of a computer system S of the present invention is shown. Within the portable computer S, a CPU 10 and a Level 2 (L2) cache 12 are connected. The processor 10 is preferably a Pentium® processor manufactured by Intel Corporation of Santa Clara, Calif. The processor 10 operates preferably with a standard IBM-PC compatible operating system, such as Windows 95, available from Microsoft Corporation of Redmond, Wash. The L2 cache 12 provides additional caching capabilities to the processor's on-chip cache to improve performance.

The CPU 10 and the L2 cache 12 are connected to a host/PCI bridge 14. Also connected to the host/PCI bridge 14 is a system DRAM 16. The host/PCI bridge 14 is further coupled to a PCI bus P that connects to a PCMCIA/CardBus controller 18 and a video chip 20 including a video graphics controller and video memory. The PCMCIA/CardBus controller 18 is also coupled to a set of PCMCIA cards 22 for connecting a variety of peripherals to the portable computer S.

A PCI/ISA bridge 24 is used to connect the PCI bus P and an ISA bus I. Coupled to the PCI/ISA bridge 24 is an IDE interface 26 which connects to a CD-ROM drive 28 having an IDE controller and to a hard disk drive 30. The IDE interface 26 is preferably a busmaster and an IDE/ATA interface having enhanced IDE features. The CD-ROM drive 28 is preferably compliant with ATAPI (AT Attachment Packet Interface), the IDE standard for CD-ROM drives, and includes a CD-ROM drive controller 102 that is preferably embedded in the CD-ROM drive 28. Also, integrated in the PCI/ISA bridge 24 is a set of programmable interrupt controllers (PIC) 15 for managing hardware interrupts according to their priority. The set 15 preferably includes two cascaded PICs for allowing interrupt channels IRQ0-IRQ15.

Numerous chips which are preferably integrated into the PCI/ISA bridge 24 are coupled to the ISA bus I. Both a modem 32 and an audio chip 34 are coupled to the ISA bus I. The audio chip 34 is further coupled to a device 36 for outputting analog signals such as a set of speakers of the computer system S or an external stereo system. The speakers 36 are preferably audible externally while the portable computer case S is in a closed state. Also, a S-IO chip 38 is coupled to the ISA bus I. The S-IO chip 38 provides a parallel port 40, a serial port 42 and connects to a floppy disk drive 44. To more clearly illustrate the features and operation of the present invention, certain conventional computer devices and systems are not shown.

A keyboard controller 46 is also coupled to the ISA bus I. The keyboard controller 46 typically connects to a keyboard 48, a PS/2 port 50, a battery 52, an LCD bias/control port 54 and a power switch 58. The keyboard controller 46 of the present invention includes system management interrupt (SMI) circuitry for generating system management interrupts. Certain processors, such as the Pentium® processor, have included a mode referred to as a system management mode (SMM) which is entered upon receipt of a system management interrupt. A SMI is the software interrupt with the highest priority and is operating system independent. Generation of a SMI also causes a SMI handler 98, which is typically located in a protected memory address space of the system DRAM 16, to be executed. A SMI handler 98 is an interrupt service routine for performing specific system management tasks, like reducing power to specific devices or providing security services. SMI handler code thus may be written by one of ordinary skill in the art to perform a variety of system management tasks.

For the keyboard controller embodiment of the present invention, the keyboard controller 46 is further coupled to an audio CD mode switch 56, DM_SW. For the CD-ROM drive controller embodiment of the present invention, the CD-ROM drive controller 102 is coupled to the audio CD mode switch 56, DM_SW. If the power switch 58 of the computer system S is in an "on" state, the audio CD mode switch 56 is disabled. If the power switch 58 of the computer system S is in an "off" state, the audio CD mode switch 56 is enabled. When the audio CD mode switch 56 is enabled, the state of the switch 56 determines whether the computer system S is in an audio CD mode. The audio CD mode switch 56 when placed in an "on" state serves to place the computer system S of the present invention in an audio CD mode. Audio CD mode enables the computer system S of the present invention to bypass traditional system BIOS and play audio CDs in a CD-ROM drive 28 without running an operating system.

When the power switch 58 of a contemporary computer system is placed in an "on" state or the power switch of the computer system S of the present invention is placed in an "on" state while the audio CD mode switch 56 is in an "off" state such that the computer system S is in a PC mode, the operating system of the computer proceeds to access and execute the system BIOS in the BIOS ROM. Executing system BIOS code results in a lengthy booting process wherein a power-on-self-test (POST) is performed on the system hardware in the computer system. In order to operate a CD-ROM drive in a conventional computer, an operating system must be loaded and a CD-ROM drive application initiated such that the device driver of the CD-ROM drive application serves as the interface between the CD-ROM drive and the operating system. The initiation of a CD-ROM application requires significant user interaction such as popping up windows and clicking on various portions of a computer screen.

Contrastingly, the computer system S of the present invention is capable of avoiding the lengthy boot process associated with contemporary BIOS ROM and the significant user interaction associated with a contemporary CD-ROM drive application by providing an audio CD mode. For the keyboard controller embodiment of the present invention, when the computer system S enters an audio CD mode, the processor-memory subsystem 102, the PCI/ISA bridge 24, the CD-ROM drive 28, the host/PCI bridge 14, the audio CD ROM 60, and the keyboard controller 46 are powered. ROM-based code including code for processing CD button selections is then loaded from an alternate BIOS ROM device, the audio CD ROM 60, instead of a conventional BIOS ROM device 62. An operating system is not loaded thereby significantly reducing the duration of the system initialization. Rather than using a ROM device for conventional BIOS code and a separate ROM device for the audio CD code of the present invention, the present invention may also be achieved by using a single ROM device. The single ROM device includes a memory address range for conventional BIOS code and a memory address range for audio CD code of the present invention. If the audio CD select signal is unasserted, a memory address range for conventional BIOS code is selected. If the audio CD select signal is asserted, a memory address range for audio CD code of the present invention is selected. Preferably, the conventional BIOS code and the audio CD code share common code such as POST code. Also, the firmware in the audio CD ROM 60 region is preferably shadowed in the system DRAM 16 to accelerate BIOS accesses.

For the CD-ROM drive controller embodiment of the present invention, when the computer system S enters an audio CD mode, only the CD-ROM drive 28 and the CD-ROM drive controller 102 are powered. While code is loaded from an alternate BIOS ROM region for the keyboard controller embodiment, the CD-ROM drive controller embodiment does not require embedded in an alternate ROM region code to process CD button selections since a CD-ROM drive controller 102 may directly provide CD button selections to a CD-ROM drive 28. Although use of a ROM region is described for both embodiments, the present invention extends to other non-volatile memory types.

Further, when the keyboard controller embodiment of the computer system S is placed in an audio CD mode, an audio CD select signal, DMSEL, is asserted and directed to a multiplexer or gate 64. The multiplexer or gate 64 receiving the audio CD select signal is coupled to or integrated into the PCI/ISA bridge 24. If the audio CD select signal is unasserted, the multiplexer 64 selects the contemporary BIOS ROM 62 by asserting a BIOS control signal, BIOS__CS. If the audio CD select signal is asserted, the multiplexer 64 selects the audio CD ROM 60 of the present invention by asserting an audio CD control signal, DM__CS.

Figure 2:
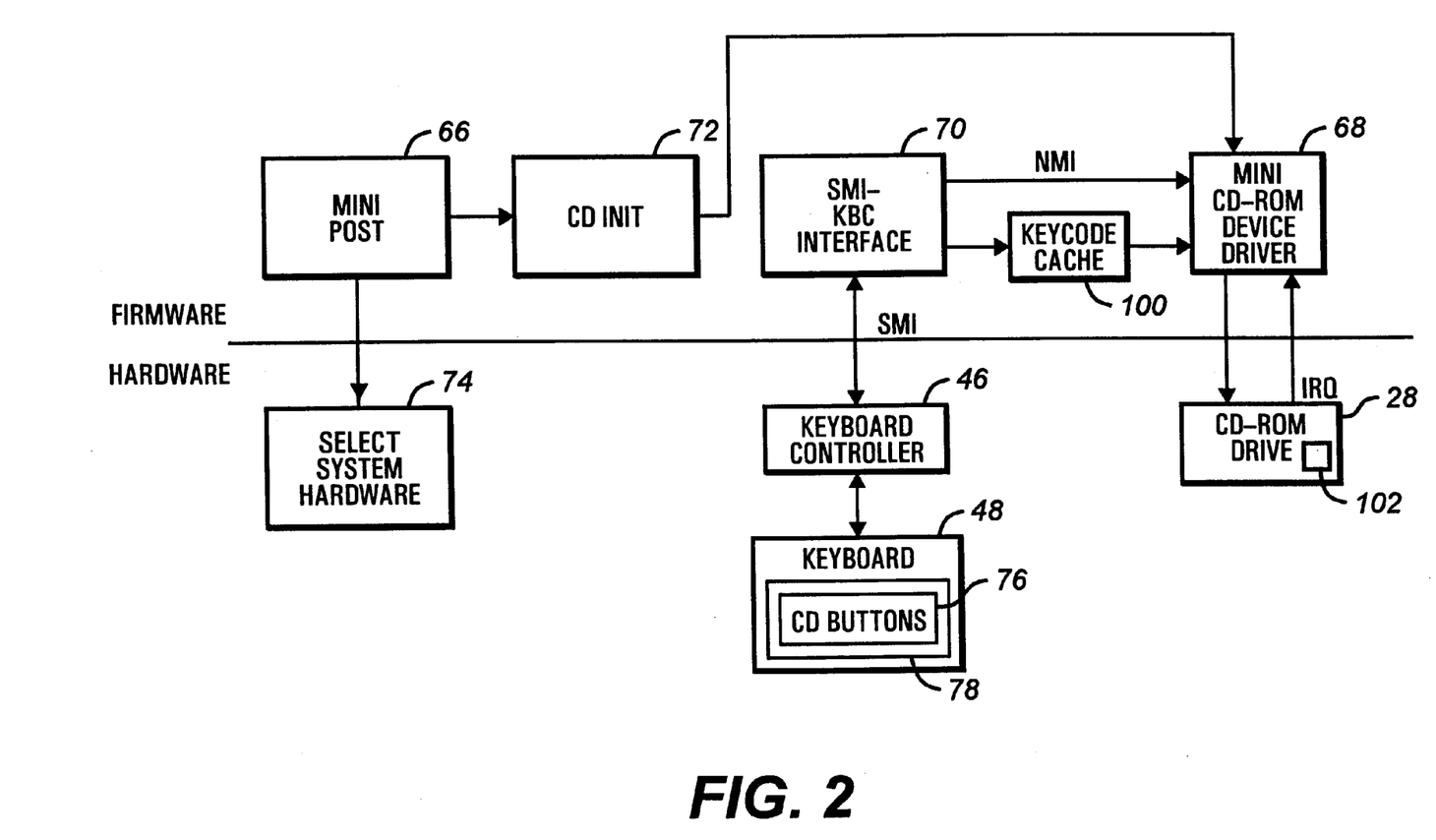
FIG. 2 is a schematic diagram of the firmware architecture within the audio CD mode ROM and associated hardware for the keyboard controller embodiment of the computer system of FIG. 1.

Turning to FIG. 2, the architecture of the firmware within the audio CD ROM 60 and associated hardware for the keyboard controller embodiment of the computer system S are shown. The firmware in the audio CD ROM 60 includes a mini-version of a power-on-self-test (POST) 66, a mini CD-ROM device driver 68, a SMI-keyboard controller interface 70, and CD INIT, the initialization code 72 for the mini CD-ROM device driver 68. Unlike the code normally run out of a contemporary BIOS ROM 62 which initializes each system hardware device, the code run out of the audio CD ROM 60 preferably allows the video chip 20, hard disk drive 30, floppy disk drive 44, and the PCMCIA/CardBus controller 18 to be unpowered. Further, in the audio CD mode, the S-IO 38 is preferably powered in a low power state. Thus, the mini-version of POST 66 in the audio CD ROM 60 initializes select system hardware 74.

CD INIT 72 initializes the CD-ROM drive 28 when called by the mini-version of POST 66. While a conventional CD-ROM device driver in CD-ROM applications is RAM-based, the mini CD-ROM device driver 68 in the audio CD ROM 60 is ROM-based. Also, while the CD-ROM device driver in conventional CD-ROM applications must allow for playing audio and data CDs, the mini CD-ROM driver 68 in the audio CD ROM 60 allows for playing audio CDs, not data CDs, thereby requiring less code and reducing the execution time of the device driver code.

Figure 5:
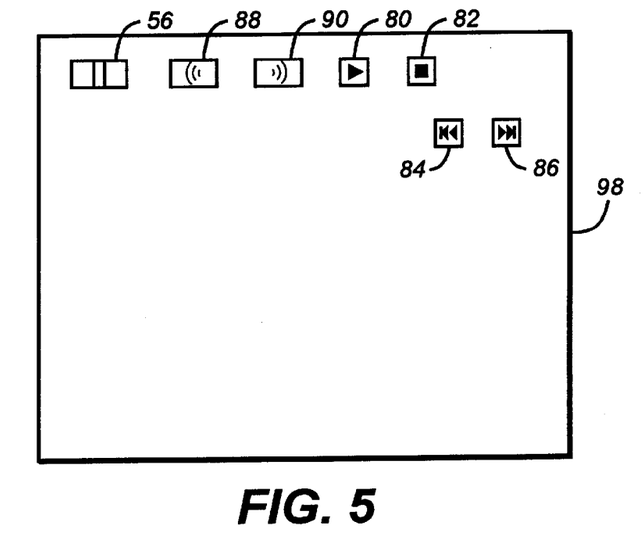
FIG. 5 is a plan view of a case containing the portable computer system of FIG. 1 in a closed state showing the CD buttons.
Figure 6:
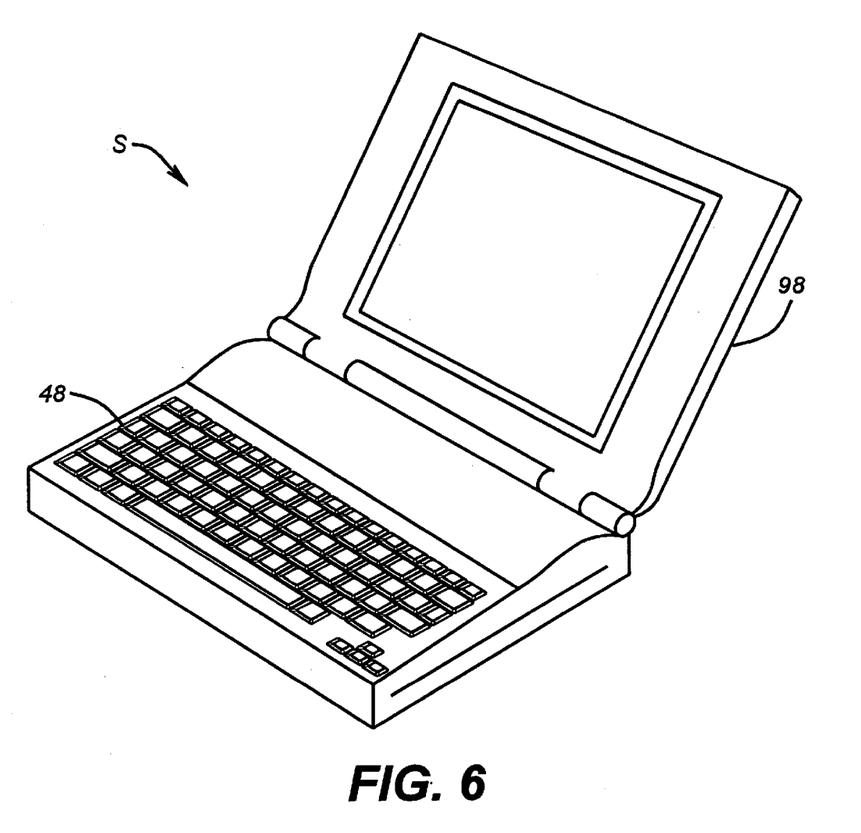
FIG. 6 is a perspective view of the portable computer system case of FIGS. 1 and 5 in an open state.

In the keyboard controller embodiment of computer system S of the present invention, switches corresponding to CD buttons 76 are integrated into a keyboard matrix 78 of the keyboard 48. For the CD-ROM drive controller embodiment, the CD buttons are coupled to the CD-ROM drive controller 102. The CD buttons 76 preferably include play/pause 80, stop 82, previous track 84, next track 86, volume controls 88 and 90, and other typical buttons provided on an audio CD player (FIG. 5). In addition to the CD buttons 76, a bass boost function is available in the PC mode and the audio CD mode. The bass boost function, which amplifies the audio output of the computer system, is preferably toggled by pressing function F1 on the keyboard 48. Also, while conventional keys of a computer are typically provided on the keyboard as shown in FIG. 6, the CD buttons 76 are preferably provided for a user on the top outer surface 98 of a portable computer system S of the present invention as shown in FIG. 5. Similarly, the audio CD mode switch 56 is preferably provided on the top outer surface 98 of the portable computer S. It should be understood, however, that the CD buttons 76 and the audio CD mode switch 56 may be provided on or in other surfaces of the computer S or on an infrared transmitter or blaster for providing infrared communication to the computer S. Providing the audio CD mode switch 56 and the CD buttons 76 on the top outer surface 98 allows for audio CD functionality while the portable computer S system case is in a closed state.

Figure 4A:
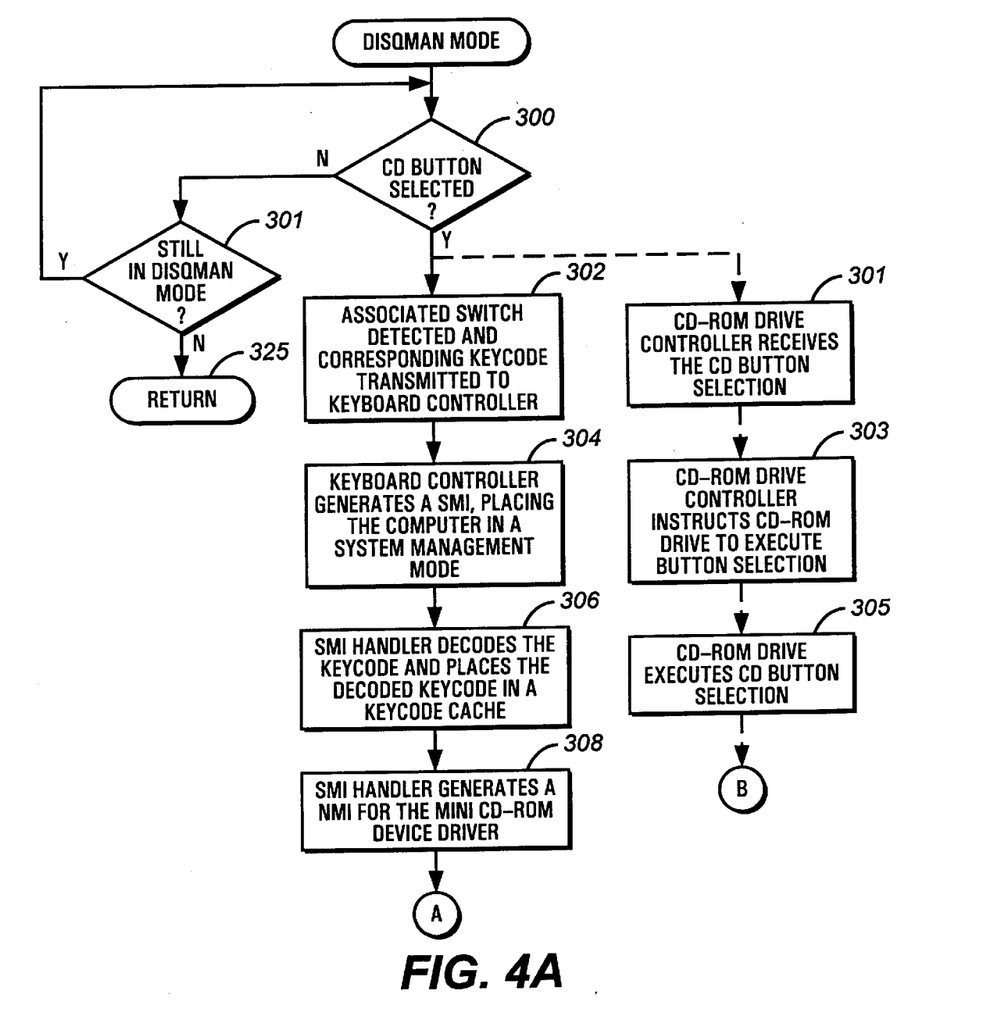
FIGS. 4A and 4B are flow charts of the steps for processing a selected CD button of the computer system of FIG. 1 using the firmware of FIG. 2 or the CD-ROM drive controller embodiment of the present invention.

Turning to FIG. 4A, in step 300 when a CD button is selected and the computer system S is in an audio CD mode, control proceeds to step 302 in the keyboard controller embodiment and step 301 in the CD-ROM drive controller embodiment. In step 302, a switch corresponding to the selected CD button closes and is detected by a keyboard chip. The keyboard chip then sends the keycode corresponding to the detected switch to the keyboard controller 46. When the computer S is in an audio CD mode, the keyboard controller 46 regularly checks the status of the keyboard or scan matrix 78 to determine the state of the switches corresponding to the CD buttons 76. If a CD button is not selected, control proceeds to step 301 where it is determined if the computer S is still in an audio CD mode. If not, the method for processing a CD button returns through step 325. If the computer S is still in an audio CD mode at step 301, control proceeds to step 300 where it is again determined if a CD button has been selected. Thus, when the computer system S is in an audio CD mode, control remains at step 300 until selection of a CD button is detected.

From step 302, control proceeds to step 304 where the keyboard controller 46 which includes SMI circuitry generates a system management interrupt placing the computer system S in a system management mode. The generation of a system management interrupt causes the SMI handler 98 to be executed. Control is passed from the keyboard controller 46 to the SMI handler 98 using SMI-keyboard controller interface firmware 70 (FIG. 2). The technique used for designing SMI-keyboard controller interface firmware is known in the art. Next, in step 306, the SMI handler 98 fetches the keycode from the keyboard controller 46, decodes the keycode, and places the decoded keycode in a keycode cache 100. The keycode cache 100 is a portion of RAM in the system DRAM 16 which serves as a buffer between the SMI handler 98 and the mini CD-ROM device driver 68 (FIG. 2).

From step 306, control proceeds to step 308 where the SMI handler 98 generates a non-maskable interrupt (NMI). A NMI, which is directly supplied to the processor 10 via a NMI pin, is a hardware interrupt typically generated to indicate a memory parity error. In the present invention, however, a NMI indicates that the keycode to be transmitted is present in the keycode cache 100. In a conventional computer system, a device driver is called by an operating system and serves as the link between an operating system and a CD-ROM device. In the computer system S of the present invention, however, the mini CD-ROM device driver 68 is called by the SMI handler's generation of a NMI such that the device driver 68 serves as a link between the SMI handler 98 and the CD-ROM drive 28.

Figure 4B:
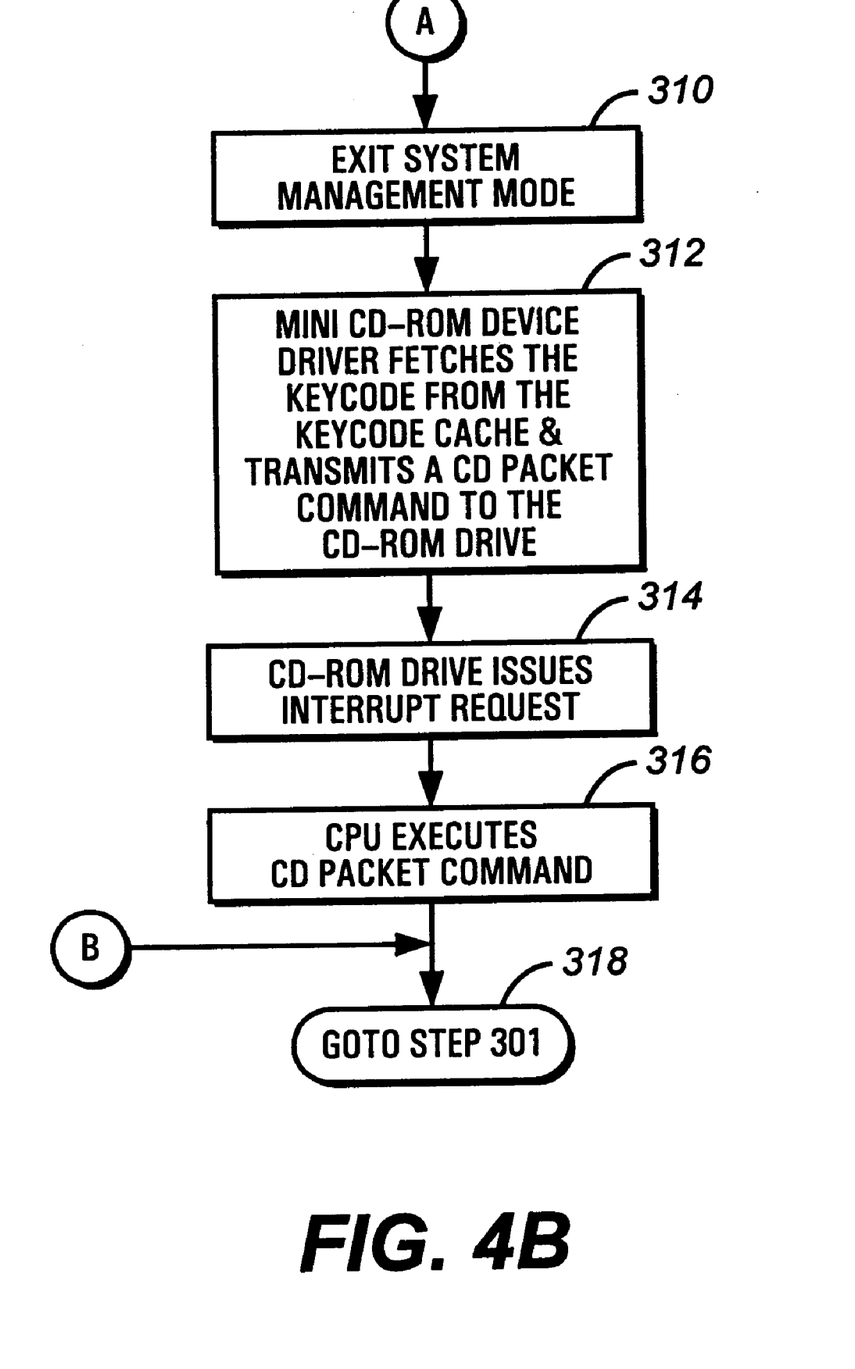

Turning to FIG. 4B, in step 310, the computer system S exits the system management mode. As the keycode corresponding to the selected CD button has been decoded and placed in the keycode cache 100, the job of the SMI handler 98 is completed. Next, in step 312, the mini CD-ROM device driver 68 fetches the keycode from the keycode cache 100 and transmits a CD packet command corresponding to the keycode to the CD-ROM drive 28. Thus, the mini CD-ROM device driver 68 in step 312 services the NMI generated in step 308. The mini CD-ROM device driver 68 essentially serves as a NMI handler. Since the NMI was generated while the computer system S was in a system management mode, the NMI was suspended until the system management mode was exited. Further, the transmitted CD packet command allows the mini CD-ROM device driver 68 to drive the CD-ROM drive 28. The CD packet command is preferably a simplified version of a Small Computer System Interface (SCSI) command and adheres to an ATAPI packet command protocol. In addition, handshaking signals are passed between the mini CD-ROM device driver 68 and the drive 28 pursuant to ATAPI protocol.

Control next proceeds to step 314 where the drive 28 issues an interrupt request (IRQ) preferably over the IRQ15 channel. The issued interrupt request informs the processor 10 that the drive 28 is ready for execution of the CD packet command. The interrupt request delivered to the CPU 10 is first transferred to a programmable interrupt controller 15 which drives an interrupt line to the CPU 10. From step 314, control proceeds to step 316 where the CPU 10 executes the CD packet command. For example, if the CD button selected was the play button, the CD-ROM drive 28 plays the audio CD in the drive 28.

Alternatively, in the CD-ROM drive controller embodiment of the present invention, an embedded CD-ROM drive controller 102 is used to process a CD button selection instead of the keyboard controller 46 and SMI and NMI interrupt routines. The use of an embedded CD-ROM drive controller 102 to transmit a CD button selection is described by steps 301, 303, and 305. From step 300, control may proceed to step 301 wherein the CD-ROM drive controller 102 receives the CD button selection. As with the keyboard controller 46, the CD-ROM drive controller 102 periodically scans the CD buttons 76. In order to use a CD-ROM drive controller 102 in place of a keyboard controller 46, the CD-ROM drive 28 must provide for a sufficient number of inputs to the controller 102 to allow for CD button scanning.

From step 301, control proceeds to step 303. In step 303, the CD-ROM drive controller instructs the CD-ROM drive 28 to execute an operation corresponding to the CD button selected. While using a keyboard controller 46 to scan the CD buttons 76 involves use of SMI and NMI routines to call the mini CD-ROM device driver 68, using a CD-ROM drive controller 102 to scan the CD buttons 76 allows for directly transmitting a CD button selection to the CD-ROM drive 28 without the need for a device driver to translate the CD button selection. Control next proceeds to step 305 where the CD-ROM drive 28 executes the operation corresponding to the CD button selected. Thus, use of a CD-ROM drive controller 102 to transmit a CD button selection replaces embedded code of the present invention in an alternate ROM region as used in the keyboard controller embodiment of the present invention, resulting in a self-contained CD-ROM drive 28.

Figure 3:
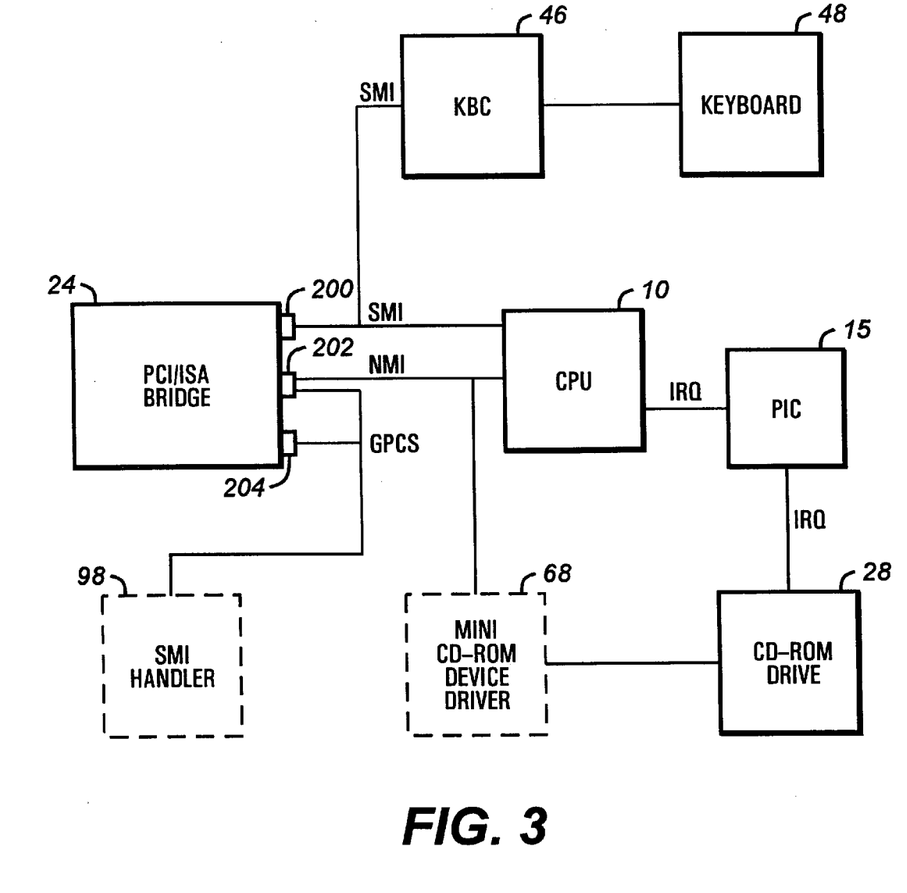
FIG. 3 is a schematic diagram of hardware and software for the keyboard controller embodiment of the computer system of FIG. 1 showing the use of a SMI, NMI, and IRQ interrupt routines.

Turning to FIG. 3, a schematic diagram of the hardware and software of an exemplary keyboard controller embodiment of the present invention involving SMIs, NMIs, and IRQs is shown. The PCI/ISA bridge 24 supports a SMI pin 200, a NMI pin 202, and a general purpose chip select (GPCS) pin 204. The keyboard controller 46 is coupled to the SMI pin 200 so that the controller 46 may assert a SMI in response to the selection of a CD button. The SMI pin 200 is also coupled to CPU 10 so that the SMI generated by the controller 46 is sent to the processor 10. The SMI received by the processor 10 places the computer S in a system management mode.

The GPCS pin 204 is a general purpose pin typically used to select peripheral devices. Here, however, the GPC5 pin 204 is used by the SMI handler 98 to generate an NMI. The SMI handler 98 which is coupled to the GPC5 pin 204 generates an NMI by first asserting or toggling the GPC5 pin 204. The GPC5 pin 204 is coupled to the NMI pin 202 providing an input to the NMI pin 202. The assertion of the GPC5 pin 204 thereby results in the assertion of the NMI pin 202. In this way, the SMI handler 98 generates an NMI. The NMI, however, is not serviced until the system management mode of the computer system S is exited.

The NMI pin 202 is coupled to the CPU 10 and the mini CD-ROM device driver 68. While the other blocks illustrated in FIG. 3 are hardware, the device driver 58 as well as the handler 98 are shown in broken line format to indicate that each is software or firmware. When a NMI is generated by a SMI, the NMI pin 202 is asserted to generate a NMI to the CPU 10. The NMI pin 202 is coupled to the driver 68 so that when the NMI is serviced an interrupt vector is formed to the driver 68. When the CD-ROM drive 28 is ready to be driven by the mini CD-ROM device driver 68, the CD-ROM drive 28 issues an interrupt request (IRQ). The interrupt request is received and managed by a PIC 15. The request is then passed by the PIC 15 to the CPU 10. Further, when a CD-ROM drive controller 102 is used for CD button processing in the present invention, the embodiment shown in FIG. 3 is not necessary to achieve a computer system S with an audio CD mode.

Returning to FIG. 4B, from step 316 and step 305, control proceeds to step 318 where the method returns to step 301. In step 301, it is determined if the computer system S is still in an audio CD mode. The method ends in step 325 if the computer S is not in an audio CD mode. It is noted that the audio CD mode may be exited at or between any of the above described steps. A user causes the portable computer system S of the present invention to exit the audio CD mode by switching the audio CD mode switch 56 to an "off" state. The audio CD mode is preferably exited by the user when playing an audio CD is no longer desired.

The computer system S of the present invention having an audio CD mode integrates a portable or desktop computer and an audio CD player. In fact, the portable computer system S of the present invention matches the portability of portable audio CD players. Further, by steering a chip select of a BIOS ROM based on the state of the audio CD switch 56, using a ROM-based CD-ROM device driver embedded in an audio CD ROM 60 to drive a CD-ROM drive 28, and using the keyboard controller 46 and the SMI handler 98 to process a keycode for a CD button, the keyboard controller embodiment of the present invention provides a pseudo-embedded architecture for a computer system S capable of playing audio CDs without use of an operating system. Alternatively, by powering a CD-ROM drive 28 and a CD-ROM drive controller 102, not-powering other devices in the computer system S based on the state of the audio CD switch 56, and using the embedded CD-ROM drive controller 102 to transmit a CD button selection to the CD-ROM drive 28, the CD-ROM drive embodiment of the present invention provides a computer system S with a self-contained CD-ROM drive 28 capable of playing audio CDs without use of an operating system.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system capable of playing audio CDs in a CD-ROM drive independent of an operating system using an embedded CD-ROM drive application when placed in an audio CD mode, the computer system including a keyboard controller having system management interrupt circuitry and a SMI handler, the computer system comprising:
   a processor;
   a switch for placing the computer system in the audio CD mode, the computer system being in the audio CD mode when the switch is in an on state and the computer system not being in an audio CD mode when the switch is in a off state;
   a non-volatile memory having a first region and a second region capable of being coupled to said switch, the first region storing system BIOS code for loading an operating system and a CD-ROM drive application associated with the operating system and the second region storing an embedded CD-ROM drive application;
   a CD-ROM drive coupled to said switch, wherein said CD-ROM drive is coupled to said first region when said switch is in an off state and said CD-ROM drive is coupled to said second region when said switch is in an on state; and
   an embedded CD-ROM drive application stored in said second region comprising:
      power-on-self-test (POST) code for selectively powering and initializing hardware devices in the computer system;
      embedded CD-ROM device driver for driving said CD-ROM drive;
      initialization code for said embedded CD-ROM device drive; and
      SMI/keyboard controller interface code for interfacing the SMI handler and the keyboard controller.

2. The computer system of claim 1, the computer system having CD buttons for operating a CD-ROM drive, further comprising:
   a keyboard controller having SMI circuitry for generating a SMI linking the keyboard controller to said SMI/keyboard controller interface code; and
   a keyboard coupled to said keyboard controller, the keyboard including a keyboard matrix in which switches corresponding to the CD buttons are integrated.

3. The computer system of claim 2, each CD button having a keycode, further comprising:
   system memory including a keycode cache for temporarily storing a keycode; and
   SMI handler code stored in said system memory, comprising:
      code for retrieving a keycode from said keyboard controller;
      code for placing the keycode in a keycode cache of said system memory; and
      code for generating a non-maskable interrupt for calling said embedded CD-ROM device driver.

4. A computer system capable of playing audio CDs in a CD-ROM drive independent of an operating system using an embedded CD-ROM drive application when placed in an audio CD mode, the computer system comprising:
   a first bus;
   a second bus;
   a third bus;
   a first bridge between said first bus and said second bus;
   a second bridge between said second bus and said third bus;
   a processor coupled to said first bridge;
   a switch coupled to said second bridge for placing the computer system in the audio CD mode, the computer system being in the audio CD mode when the switch is in an on state and the computer system not being in an audio CD mode when the switch is in an off state;
   a first non-volatile memory having a first region and a second region capable of being coupled to said switch, the first region storing system BIOS code for loading an operating system and a CD-ROM drive application associated with the operating system and the second region storing an embeded CD-ROM drive application;
   a keyboard controller having system management interrupt circuitry (SMI) and a SMI handler;
   a CD-ROM drive coupled to said second bridge, said drive being driven to process an audio CD by the embedded CD-ROM drive application in said second region when the computer system is in an audio CD mode,
   wherein said second bridge is coupled to said first region when said switch is in an off state and said second bridge is coupled to said second region when said switch is in an on state; and
   the embedded CD-ROM drive application comprising:
      power-on-self-test (POST) code for selectively powering and initializing hardware devices in the computer system;
      embedded CD-ROM device driver for driving said CD-ROM drive;
      initialization code for said embedded CD-ROM device driver; and
      SMI/keyboard controller interface code for interfacing the SMI handler and the keyboard controller.

5. A computer system capable of playing audio CDs in a CD-ROM drive independent of an operating system using an embedded CD-ROM drive application when placed in an audio CD mode, the system comprising:
   a first bus;
   a second bus;
   a third bus;
   a first bridge between said first bus and said second bus;
   a second bridge between said second bus and said third bus;
   a processor coupled to said first bridge;
   a switch coupled to said second bridge for placing the computer system in the audio CD mode, the computer system being in the audio CD mode when the switch is in an on state and the computer system not being in an audio CD mode when the switch is in an off state;

a first non-volatile memory having a first region and a second region capable of being coupled to said switch, the first region storing system BIOS code for loading an operating system and a CD-ROM drive application associated with the operating system;

a SMI handler;

the second region storing an embedded CD-ROM drive application;

a CD-ROM drive coupled to said second bridge, said drive being driven to process an audio CD by the embedded CD-ROM drive application in said second region when the computer system is in an audio CD mode;

wherein said second bridge is coupled to said first region when said switch is in an off state and said second bridge is coupled to said second region when said switch is in an on state; and an embedded CD-ROM drive application stored in said second region comprising:
  power-on-self-test (POST) code for selectively powering and initializing hardware devices in the computer system;
  embedded CD-ROM device driver for driving said CD-ROM drive; and
  initialization code for said embedded CD-ROM device driver; and
  wherein the SMI handler is capable of generating a non-maskable interrupt (NMI) for calling said embedded CD-ROM device driver of said embedded CD-ROM drive application.

6. A computer system capable of playing audio CDs in a CD-ROM drive independent of an operating system using an embedded CD-ROM drive application when placed in an audio CD mode, the computer system comprising:

a first bus;
a second bus;
a third bus;
a first bridge between said first bus and said second bus;
a second bridge between said second bus and said third bus;
a processor coupled to said first bridge;
a switch coupled to said second bridge for placing the computer system in the audio CD mode, the computer system being in the audio CD mode when the switch is in an on state and the computer system not being in an audio CD mode when the switch is in an off state;
a first non-volatile memory having a first region and a second region capable of being coupled to said switch, the first region storing system BIOS code for loading an operating system and a CD-ROM drive application associated with the operating system and the second region storing an embeded CD-ROM drive application;
a CD-ROM drive coupled to said second bridge, said drive being driven to process an audio CD by the embedded CD-ROM drive application in said second region when the computer system is in an audio CD mode;
wherein said second bridge is coupled to said first region when said switch is in an off state and said second bridge is coupled to said second region when said switch is in an on state;

an embedded CD-ROM drive application stored in said second region comprising:
  power-on-self-test (POST) code for selectively powering and initializing hardware devices in the computer system;
  embedded CD-ROM device driver for driving said CD-ROM drive; and
  initialization code for said embedded CD-ROM device driver; and
the computer system including a SMI handler and CD buttons, each CD button having a keycode, the computer system further comprising:
  a SMI handler;
  CD buttons, each CD button having a keycode; and
  a keycode cache for receiving a keycode from the SMI handler and temporarily storing the keycode.

7. The computer system of claim 6, wherein the embedded CD-ROM device driver of said embedded CD-ROM drive application fetches the keycode from said keycode cache.

8. The computer system of claim 6, the computer system having a system memory, wherein said keycode cache is a portion of memory space in the system memory.

9. A computer system capable of playing audio CDs in a CD-ROM drive independent of an operating system using an embedded CD-ROM drive application when placed in an audio CD mode, the computer system comprising:

a first bus;
a second bus;
a third bus;
a first bridge between said first bus and said second bus;
a second bridge between said second bus and said third bus;
a processor coupled to said first bridge;
a switch coupled to said second bridge for placing the computer system in the audio CD mode, the computer system being in the audio CD mode when the switch is in an on state and the computer system not being in an audio CD mode when the switch is in an off state;
a first non-volatile memory having a first region and a second region capable of being coupled to said switch, the first region storing system BIOS code for loading an operating system and a CD-ROM drive application associated with the operating system and the second region storing an embeded CD-ROM drive application;
a CD-ROM drive coupled to said second bridge, said drive being driven to process an audio CD by the embedded CD-ROM drive application in said second region when the computer system is in an audio CD mode,
wherein said second bridge is coupled to said first region when said switch is in an off state and said second bridge is coupled to said second region when said switch is in an on state;
the computer system including a keyboard controller and CD buttons, each CD button having a keycode, the embedded CD-ROM drive application including an embedded CD-ROM device driver, the computer system further comprising:
  system memory, including a keycode cache for temporarily storing a keycode; and
  SMI handler code stored in said system memory comprising:
    code for retrieving a keycode from a keyboard controller;
    code for placing the keycode in a keycode cache of said system memory; and code for generating a non-maskable interrupt for calling the embedded CD-ROM device driver.

10. A method of playing an audio CD in a CD-ROM drive of a computer system without booting up an operating system, the computer system having a CD-ROM device driver embedded in a non-volatile memory region, a main power switch, CD buttons with corresponding keycodes, and a switch for placing the computer system in an audio CD mode, comprising the steps of:

setting the switch for placing the computer system in an audio CD mode to an on state while the main power switch is in an off state;

selecting a CD button;

transmitting a keycode for the selected CD button to the embedded CD-ROM device driver;

driving the CD-ROM drive to process the audio CD; and the computer system including a keyboard controller and a SMI-keyboard controller interface embedded in a read-only-memory region, wherein the step of transmitting a keycode for a CD button to the embedded CD-ROM device driver comprises the steps of:

scanning the CD buttons;

fetching the keycode corresponding to a selected CD button by the keyboard controller;

generating a system management interrupt by the keyboard controller placing the computer system in a system management mode executing a SMI handler;

fetching the keycode from the keyboard controller by the SMI handler;

placing the keycode in a keycode cache by the SMI handler;

generating a non-maskable interrupt by the SMI handler for calling the embedded CD-ROM device driver;

exiting the system management mode of the computer system;

servicing the non-maskable interrupt calling the embedded CD-ROM device driver; and     fetching the keycode from the keycode cache by the embedded CD-ROM device driver.

\* \* \* \* \*